United States Patent [19]

Vindez

[11] Patent Number: 4,538,942

[45] Date of Patent: Sep. 3, 1985

[54] POSITIVE FEED DRILL WITH STOP CONTROL

[75] Inventor: Pierre G. Vindez, Redondo Beach, Calif.

[73] Assignee: P.V. Tool, Inc, Gardena, Calif.

[21] Appl. No.: 620,354

[22] Filed: Jun. 13, 1984

[51] Int. Cl.³ .................. B23B 47/22; B23Q 5/20
[52] U.S. Cl. ............................ 408/14; 173/19; 173/146; 408/132; 408/137
[58] Field of Search ............... 29/26 A; 408/14, 11, 408/132, 137; 173/29, 19, 145, 146

[56] References Cited

U.S. PATENT DOCUMENTS

| | | | |
|---|---|---|---|
| 434,576 | 8/1890 | Wyman | 408/137 X |
| 3,429,206 | 2/1969 | Quackenbush | 408/132 |
| 3,512,434 | 5/1970 | Juhasz et al. | 408/132 X |
| 3,574,290 | 4/1971 | Eckman | 408/132 X |
| 3,583,822 | 6/1971 | Alexander | 408/137 |
| 4,418,767 | 12/1983 | Vindez | 173/19 |

*Primary Examiner*—Donald R. Schran
*Attorney, Agent, or Firm*—Freilich, Hornbaker, Rosen & Fernandez

[57] ABSTRACT

A positive feed drill having a spindle drive gear train and a spindle feed gear train, coupled to the drive gear train by side teeth on respective drive and feed coupling gears mounted on a common shaft, is provided with a spring between the feed coupling gear and a housing to bias the feed coupling gear against the drive coupling gear to feed the spindle forward as it drills. A positive stop prevents the spindle from feeding beyond a predetermined point, thus causing the feed coupling gear to be driven by the spindle. A slope on the faces of the side teeth engaging the drive and coupling gears in order to allow the feed coupling gear to ratchet over the drive coupling gear when the spindle feed reaches the positive stop.

2 Claims, 6 Drawing Figures

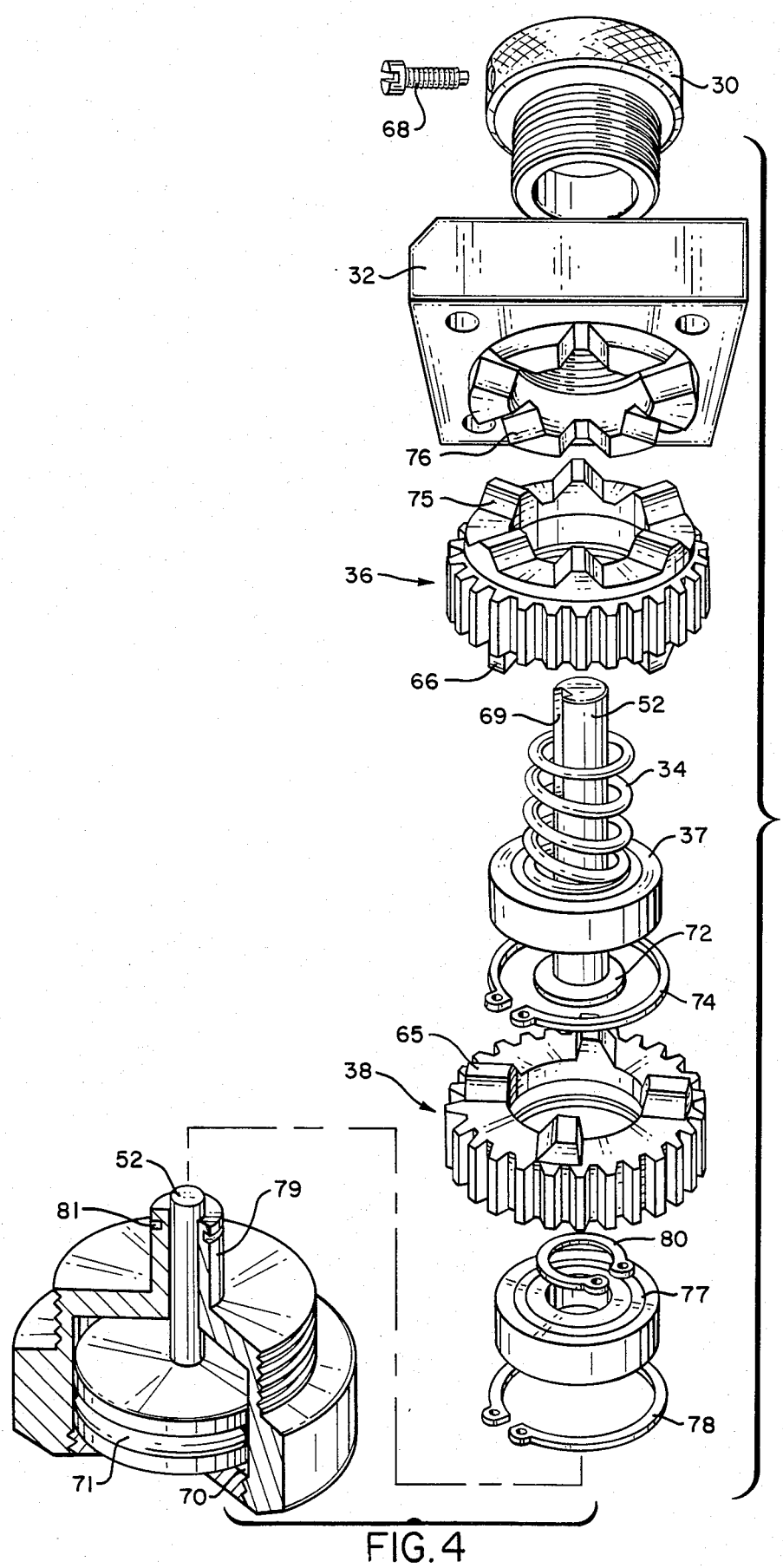
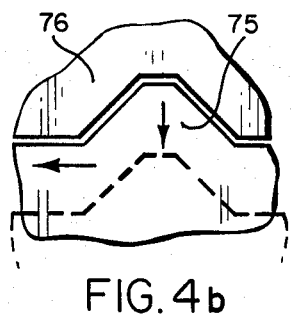
FIG. 4b
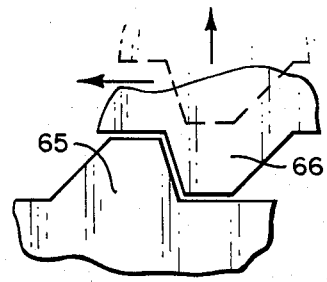
FIG. 4a
FIG. 4

POSITIVE FEED DRILL WITH STOP CONTROL

BACKGROUND OF THE INVENTION

This invention relates to positive feed power drills having a spindle drive gear train and a spindle feed gear train arranged to be driven by the same motor, and having means for positively stopping the spindle feed until manually placed in a retract mode for reversal of the positive feed drive, and more particularly to a system for ratcheting a feed coupling gear after the spindle has been advanced to a positive stop, thereby allowing the spindle to continue to be turned, but not further advanced, until it is retracted.

Positive feed power drills normally have a single motor for turning a spindle through a drive gear train. The spindle is threaded into a feed gear that turns for advancing the spindle as the drill progresses through a work piece. The feed gear is driven by a gear train from the same motor as the drive gear train, but the gear ratio of the drive gear train is selected to be slightly less than the gear ratio of the feed gear train so the feed gear will turn slightly faster than the drive gear. In that way, the spindle is advanced a predetermined amount for each turn through the work piece.

Once the spindle has been advanced sufficiently, it has been the practice to provide manual means to disengage the spindle feed gear train from the drive gear train and lock it in place. As the motor continues to drive the spindle in the same direction, the spindle threads turn inside the locked feed gear to automatically reverse and therefore retract the spindle. Once the spindle has been retracted, the actuatable means is reset for another drilling or countersinking cycle. For some applications, as in blind drilling where the depth has to be accurately controlled, or in countersinking applications, it is an object of this invention to simply provide a positive stop for the spindle, and allow a feed coupling gear to ratchet until such time as the retracting means is manually actuated to reverse the positive feed, and thus retract the spindle for another drilling or countersinking cycle.

The stop control feature of the present invention is practiced in a positive feed power drill having a threaded spindle passing through an internally threaded feed gear, a drive gear slidably locked onto the spindle, a drive gear train extending from a drive motor through a coupling gear to the spindle drive gear to turn the spindle at a rate set by the motor through this gear train, and a spindle feed gear train extending from a coupling gear to the spindle feed gear. The spindle feed coupling gear is releasably locked to the spindle drive coupling gear by side teeth for turning the spindle feed gear train as the spindle drive gear is turned by the motor. The gear ratios for the two trains are selected to drive the spindle feed gear at a faster rate than the spindle drive gear.

The feed coupling gear is mounted with a bearing on the same shaft that the drive coupling gear is mounted, but the feed coupling gear is mounted with a bearing on a flange integral with the shaft so that the shaft may be moved axially to uncouple the side teeth of the feed coupling gear from the drive coupling gear. A hydraulic piston is arranged at the bottom of the shaft for so raising the shaft on its axis, against the force of a compression coil spring over the coupling gear, as to raise lower side teeth of the feed coupling gear out of engagement with upper side teeth of the drive coupling gear, and raise upper side teeth of the spindle feed coupling gear into locking engagement with fixed teeth on the gear train housing while the spindle drive gear train continues to rotate. That reverses the relative rotation of the spindle in the feed gear so that the spindle is rapidly retracted. Hydraulic pressure is provided to the piston through a passage in the gear housing when a valve stem is manually actuated to a second position by means associated with the spindle after the spindle has been advanced to the positive stop.

Once the spindle is retracted, the valve stem is released so that it automatically returns to its first position. This removes the hydraulic pressure which actuates the piston, allowing the spring to force the feed coupling gear away from the fixed teeth on the gear train housing and toward the drive coupling gear for re-engagement of lower side teeth of the feed coupling gear with upper side teeth of the drive coupling gear, thereby recycling the tool for another drilling or countersinking operation, unless the drive motor is manually turned off.

SUMMARY OF THE INVENTION

In accordance with the present invention, a positive stop is provided for the spindle at either the drill bit end, or the opposite end. Thus the stop may be a simple device, such as a nut or cap on top of the spindle, but in many applications it will be a fixture placed between the positive feed drill and the work piece. In either case, the drive gear train continues to rotate the spindle, but the stop prevents advance of the spindle. As a consequence, the continued rotation of the threaded spindle in the feed gear is allowed to drive the feed coupling gear and overrun the drive coupling gear.

The feed coupling gear is normally driven in a forward direction by side teeth engaging side teeth on the drive coupling gear, so when it is instead driven by the spindle feed gear at a faster rate (owing to the gear differential between the spindle feed and spindle drive gear trains) the side teeth of the feed coupling gear will overrun the side teeth of the drive coupling gear. By shaping the engaging side teeth with a steep slope (about 15° from vertical) on engaging faces for normal drive, the side teeth of the feed coupling gear are allowed to ride up and over the equally sloped engaging face of the side teeth on the drive coupling gear once the spindle advance is stopped, and the feed coupling gear train is thus driven back through the feed gear train to rotate faster than the drive coupling gear in the same direction. The result is that as the feed coupling gear ratchets over the drive coupling gear, it will slide up and down on the shaft against the compression coil spring. The operator may then actuate a pneumatic valve which admits air under pressure to the piston cylinder. This causes the piston to move the shaft upwardly, thus raising the feed coupling gear from the drive coupling gear against the force of the coil compression spring, not only enough to stop the ratcheting, but also enough to engage upper side teeth of the feed coupling gear with fixed teeth on the inside of the gear housing to lock the feed gear. This causes the spindle to be retracted. The locking teeth are shaped with 45° faces on both sides to permit ratcheting once the spindle has been fully retracted, whereupon the operator may turn off the motor while he sets the drill for another operation.

The novel features of the invention are set forth with particularity in the appended claims. The invention will best be understood from the following description when read in connection with the accompanying drawings.

BRIEF DESCRIPTION OF THE DRAWINGS

FIG. 4 illustrates in an exploded view the components of the invention shown in FIG. 3.

FIGS. 4a and 4b illustrate in elevation the shapes of side teeth of the feed coupling gear shown in FIG. 4 with fixed teeth of the drive coupling gear and side teeth of the gear housing, respectively.

DESCRIPTION OF PREFERRED EMBODIMENTS

Figure 1:
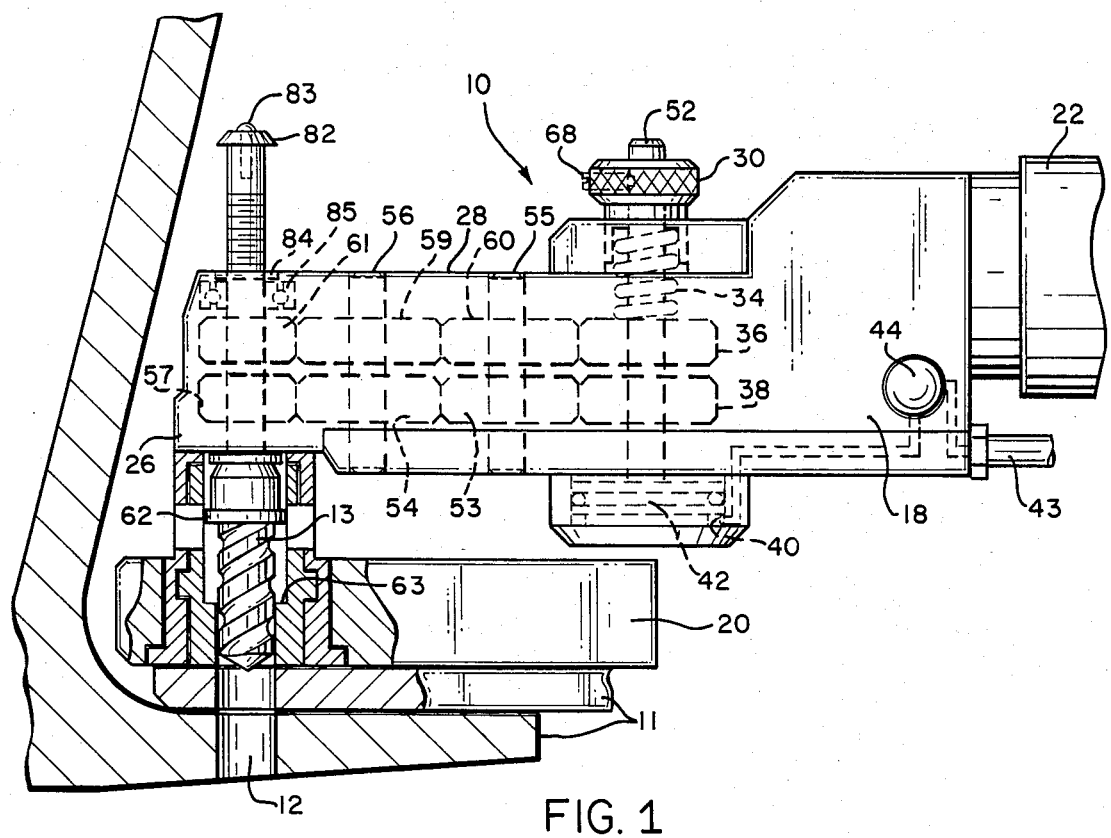
FIG. 1 is a side view in elevation of a positive feed drill, in which the invention to be described with reference to FIGS. 3 and 4 may be practiced.

Referring to FIG. 1, a positive feed drill 10 is shown on a work piece 11 through which a hole 12 is to be made by a drill bit 13 on the end of a threaded spindle 14. In practice, a spacer 16 is attached to a main housing 18 of the drill, and the entire assembly is clamped by some means 20 to the work piece. An air driven motor 22, with a hand operated lever switch (not shown) drives the spindle through a gear train in the main housing 18. The drill described thus far is generally organized the same as in a positive feed drill disclosed in greater detail in U.S. Pat. No. 4,418,767.

The main housing 18 encloses a spindle actuator section 26 and a gear train section 28. These two sections include a spindle drive gear train for turning the spindle, and a spindle feed gear train for advancing the spindle as it turns. An adjustment knob 30 on an upper housing cap 32 adjusts the compression of a coil spring 34 which holds a feed coupling gear 36 down on a drive coupling gear 38, as will be described more fully hereinafter. A hydraulic cylinder 40 houses a piston 42 which, when caused to move up in the cylinder 40, disengages the spindle feed gear train and locks it so that continued turning of the spindle drive gear train retracts the spindle. The piston is caused to move up in the cylinder 40 under hydraulic pressure introduced from a tube 43 through a valve 44 (shown in FIG. 2) manually operated by pushing the protruding end 44 of a valve stem. Once the spindle is fully retracted, the drive motor 22 is turned off manually. That shuts off air pressure to the valve, allowing it to open and vent the cylinder 40 thereby allowing the feed coupling gear to again be engaged to the drive coupling gear.

Figure 3:
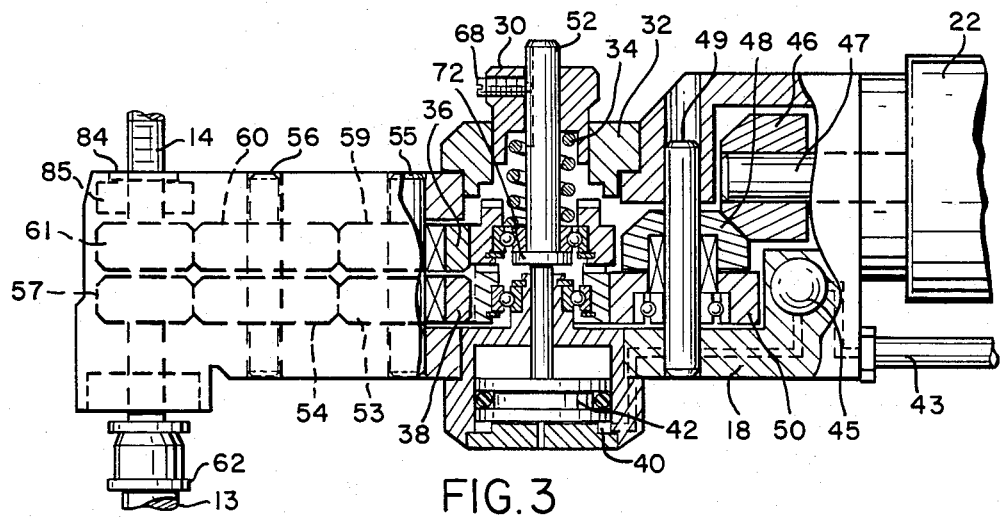
FIG. 3 shows a vertical cross section of part of the drill shown in FIG. 1 with drive and feed coupling gears embodying the invention shown in the feed mode.

Referring now to FIG. 3, which shows a vertical cross section of part of the main housing 18 attached to the motor 22, the general arrangement for driving and feeding the spindle 14 will first be described. The modification which constitutes the present invention will then be described.

A beveled gear 46 keyed on the motor shaft 47 meshes with a beveled gear 48 on a vertical shaft 49. Integral with the beveled gear 48 is a gear 50 which meshes with the drive coupling gear 38 on a vertical shaft 52 for the spindle drive train comprised of idlers 53 and 54 on respective vertical shafts 55 and 56, and a spindle drive gear 57 slidably keyed to the spindle 14.

Mounted on the shaft 52 is the feed coupling gear 36 for the spindle feed gear train comprised of idlers 59 and 60 on shafts 55 and 56, and a spindle feed gear 62 threaded on the spindle 14. As the motor turns, the drive coupling gear 38 turns, thus turning the spindle. The key, or keys, which cause the spindle to rotate with the drive gear 57 slide in longitudinal slots or keyways (not shown) in the spindle so the spindle may advance.

The feed coupling gear 36 is normally locked onto the drive coupling gear 38 by side teeth so that it too is driven by the motor through the beveled gears 46 and 48, and the gear 50 locked with the beveled gear 48. Thus, the drive coupling gear 38 turns the feed coupling gear 36 through interlocking side teeth. The spindle feed gear 61 is thus turned through the idlers 59 and 60 while the drive coupling gear 38 turns the spindle drive gear 57 through the idlers 53 and 54. If the gear ratios of both trains were the same, the spindle feed gear 61 would turn with the spindle drive gear 57, and the spindle 16 would not be advanced toward the work piece. Consequently, the gear ratio is made slightly higher for the feed gear 61 so that, as it turns faster than the spindle drive gear 57, its threads engaging the threaded spindle will feed the spindle toward the work piece at a rate proportional to the difference in speed of rotation of the gears 57 and 61. This basic principle of positive feed drilling was first disclosed in 1890 in U.S. Pat. No. 434,576.

When the spindle has been advanced sufficiently for a flanged end 62 of the spindle 14 to be stopped by an abutment 63 (shown in FIG. 1), or any other means, the spindle advance must stop, thereby causing the turning spindle to cause the feed drive gear 61 to turn (due to the threads of the turning spindle engaging threads in the feed gear 61). This in turn causes the entire spindle feed gear 58 to turn, while the spindle drive gear 57 continues to turn the spindle. Because of the differential in the gear ratios, the coupling gear 36 will now be caused to turn faster than the drive coupling gear 38. This is made possible by properly shaping the side teeth coupling of those two gears, as shown in the exploded view in FIGS. 4 and 4a, so the gear differential is now absorbed at this point by ratcheting of the feed coupling gear over the drive coupling gear.

Each of the upper teeth 65 of the drive coupling gear 38 is provided with a steep slope (about 15° from the vertical) on the face that engages the equally sloped face of tooth 66 of the drive coupling gear as shown in FIG. 4a. The tooth 66 is on the lower side of the feed coupling gear 36. The other faces of the teeth 65 and 66 are sloped about 45° from the vertical, so when the spindle is stopped by the abutment 63, and the feed gear train is driven by the turning spindle (due to the threads engaging the feed gear 61), the feed coupling gear will turn faster than the drive coupling gear by the amount of the gear differential between the feed and drive gear trains. The 15° slope will then permit the feed coupling gear teeth 66 to ride up on the side teeth 65 of the drive coupling gear against the force of the coil spring 34. The 45° angle on the other faces allow the feed coupling gear to seat back on the drive coupling gear more gently than if the faces were, for example, at less than 1° slope. The force of the compression coil spring 34 may be adjusted by screwing the knob 30 in or out of a cap 34 to give more or less driving force before the coupling gears overran each other. A set screw 68 fits into a slot 69 in the shaft, which protrudes through the knob, so that the knob cannot unscrew by itself and change the compression of the spring.

Figure 2:
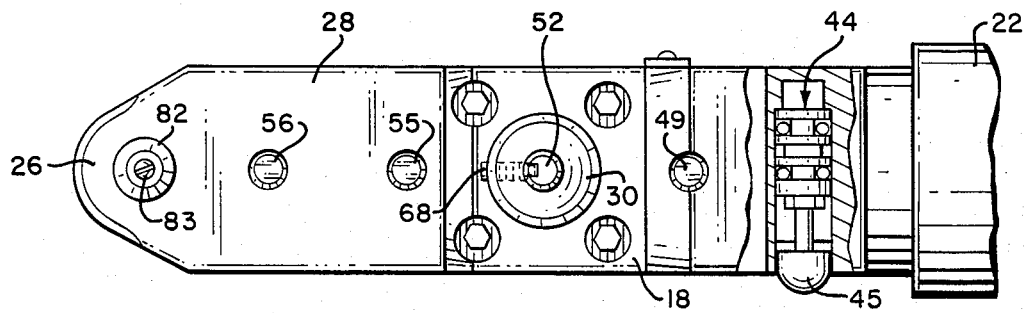
FIG. 2 is a top view of the positive feed drill shown in FIG. 1.

Once the spindle stops and the feed coupling gear 36 begins to ratchet over the drive coupling gear 38, the operator presses the end 44 of the valve stem to actuate the valve 43 shown in FIG. 2. This will introduce air under pressure into the piston cylinder 40 to cause the piston 42 to push the shaft 52 up, as may best be seen in FIG. 3. A flange 72 on the shaft raises a bearing 73 against the force of the spring 34. The feed coupling gear 36 is seated on the bearing 72, and held on that bearing by a retainer 74, so it too is raised, not only enough to disengage side teeth 65 and 66 of the drive and feed coupling gears, but also enough to engage upper side teeth 75 of the feed coupling gear with fixed teeth 76 on the inside of the gear housing, or more specifically the gear housing cap 32. The teeth are shaped with 45° slopes on both sides, as shown in FIG. 4a, for smooth locking engagement, and ratcheting once the spindle is fully retracted.

Once these locking teeth are engaged under the hydraulic pressure of the piston 71, the feed coupling gear will not turn. That locks the feed gear train so that as the drive gear train continues to turn, the spindle is rapidly retracted in accordance with the basic principle of the positive feed drill first disclosed in the aforesaid 1890 patent. Once fully retracted, the feed gear 61 will rotate with the spindle, thus causing the feed coupling gear to ratchet over locking teeth 76 on the cap 32.

It should be noted that the drive coupling gear 51 is seated on a bearing 77 and that the bearing is held in the drive coupling gear by a retainer 78. The bearing 77 is in turn seated over a sleeve 79 extending upwardly from the piston cylinder housing 70, and locked in place by a retainer 80 which fits into a groove 81 on the sleeve 79. The result is that the drive coupling gear 51 does not move up and down with the piston 71. Only the feed coupling gear is caused to move up when air pressure moves the piston 71 up. Once the spindle is retracted, the operator releases the end 44 of the valve stem to relieve the air pressure in the piston cylinder 70. This will allow the spring 34 to return the feed coupling gear 36 in engagement with the drive coupling gear 38 through their side teeth 66 and 65. Meantime, the motor 22 is turned off before relieving the air pressure in the cylinder 70 so that the spindle will not be driven forward again until the positive feed drill is set up for another drilling cycle.

In another application of this invention, when the operator cannot see the drill as it operates to know when it has drilled through the work piece, the spindle is stopped from the top by the cap 82 (shown in FIG. 1) of greater diameter than the spindle. That cap is secured to the spindle by a screw 83 to provide a positive stop at the full forward limit of the spindle. When the cap 82 reaches the limit, it seats on a disk 84 that fits over the inner race of the ball bearing 85 so that as the spindle continues to turn, that inner race, disk 84 and cap 82, turn in unison. Without the spindle being fed further forward, the gear 61 must turn due to the turning threads of the spindle. It can thus be appreciated that the spindle feed can also be stopped from the top while drilling. However, for precision such as while countersinking a drilled hole, it is preferable to provide a positive stop in a fixture between the drill and the work piece. Various designs for such fixtures are known. The particular design used in any one application is determined by the nature of the application.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. In a positive feed drill having a spindle drive gear train and a spindle feed gear train, coupled to the drive gear train by side teeth on respective drive and feed coupling gears mounted on a common shaft, a spring between said feed coupling gear and a housing for said gear trains to bias said feed coupling gear against said drive coupling gear, whereby said feed coupling gear is coupled to said drive coupling gear to feed said spindle forward as it drills, a positive stop for preventing said spindle from feeding further forward, thus causing said feed coupling gear to be driven by said spindle, and a slope on said side teeth on one side of each tooth for engaging said drive and coupling gears in order to allow said feed coupling gear to ratchet over said drive coupling gear when said spindle feed reaches said positive stop.

2. In a positive feed drill as defined in claim 1 wherein the journal for said feed coupling gear is over a flange that is integral with said shaft and having fixed teeth on said housing for engagement with teeth on said feed coupling gear on the side thereof opposite said drive coupling gear, actuatable means for moving said shaft against said spring to disengage said feed coupling gear from said drive coupling gear and lock said feed coupling gear against said fixed teeth to retract said spindle, and upon deactuation of said actuatable means to automatically allow said feed coupling gear to be disengaged from said fixed teeth and re-engaged with said drive coupling gear after said spindle has been retracted.

* * * * *